US012793295B2

(12) United States Patent
Ito

(10) Patent No.: US 12,793,295 B2
(45) Date of Patent: Nov. 10, 2026

(54) IN-VEHICLE DISPLAY DEVICE

(71) Applicants: TOYOTA JIDOSHA KABUSHIKI KAISHA, Toyota (JP); DENSO CORPORATION, Kariya (JP)

(72) Inventor: Hironori Ito, Tokyo (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 93 days.

(21) Appl. No.: 19/041,477

(22) Filed: Jan. 30, 2025

(65) Prior Publication Data

US 2025/0336114 A1 Oct. 30, 2025

(30) Foreign Application Priority Data

Apr. 24, 2024 (JP) ................................ 2024-070405

(51) Int. Cl.
*G06T 7/73* (2017.01)
*B60R 1/24* (2022.01)
*G06T 11/23* (2026.01)

(52) U.S. Cl.
CPC ................ *G06T 11/23* (2026.01); *B60R 1/24* (2022.01); *G06T 7/73* (2017.01); *B60R 2300/307* (2013.01); *B60R 2300/804* (2013.01); *G06T 2207/30256* (2013.01)

(58) Field of Classification Search
CPC .. G06V 20/588; B60W 2552/53; G06T 11/23; G06T 2207/30256; B60R 1/24; B60R 2300/307; B60R 2300/804; B60K 35/22; B60K 35/28; B60K 35/29; B60K 35/81; B60K 2360/166
USPC .......................................................... 345/581
See application file for complete search history.

(56) References Cited

U.S. PATENT DOCUMENTS

2017/0243491 A1* 8/2017 Fujii ...................... G08G 1/167
2020/0080864 A1* 3/2020 Ichinokawa ........... B60K 35/22
2020/0307380 A1 10/2020 Ikeda et al.
2022/0268598 A1 8/2022 Mori
2023/0099678 A1* 3/2023 Omagari ............. B60W 60/001 701/25

FOREIGN PATENT DOCUMENTS

JP 2020-163903 A 10/2020
JP 2022-129778 A 9/2022

* cited by examiner

*Primary Examiner* — Jacinta M Crawford
(74) *Attorney, Agent, or Firm* — Oliff PLC

(57) ABSTRACT

An in-vehicle display device displays a lane marking of a road on a display of a host vehicle. The in-vehicle display device includes: an acquisition unit configured to acquire camera lane marking information including information on a position of the lane marking and map lane marking information including information on a position of the lane marking; and a display controller configured to perform display of the lane marking. The display controller is configured to fade in the lane marking based on the map lane marking information after fading out the lane marking based on the camera lane marking information.

5 Claims, 11 Drawing Sheets

IN-VEHICLE DISPLAY DEVICE

CROSS-REFERENCE TO RELATED APPLICATIONS

This application is based upon and claims the benefit of priority from Japanese Patent Application No. 2024-070405, filed on Apr. 24, 2024, the entire contents of which are incorporated herein by reference.

BACKGROUND

Field

The present disclosure relates to an in-vehicle display device that displays a lane marking of a road on a display of a vehicle.

Description of the Related Art

For example, Japanese Unexamined Patent Publication No. 2020-163903 discloses a device that detects a lane marking on a road on which a vehicle is present and displays the detected lane marking on a display mounted on the vehicle. The device changes a length of the lane marking to be displayed on the display based on a detection distance of a detection unit (sensor) that detects the lane marking.

In a device that displays a lane marking as described above, a lane marking based on a recognition result of a camera may be displayed on a display or a lane marking based on map information may be displayed on the display. When an information source of a lane marking as above is switched, a position of the lane marking displayed on a display before and after the switching may be deviated. As a result, an occupant who sees the display may feel incompatibility.

Therefore, the present disclosure discloses an in-vehicle display device capable of switching an information source for displaying a lane marking while reducing a feeling of incompatibility of an occupant.

SUMMARY

An aspect of the present disclosure is an in-vehicle display device that displays a lane marking of a road on a display of a vehicle, the in-vehicle display device including: an acquisition unit configured to acquire first lane marking information including information on a position of the lane marking and second lane marking information including information on a position of the lane marking and different from the first lane marking information; and a display controller configured to perform display of the lane marking based on the first lane marking information and display of the lane marking based on the second lane marking information, as display of the lane marking on the display, in which the display controller is configured to, when the display of the lane marking based on the first lane marking information is switched to the display of the lane marking based on the second lane marking information, display the lane marking based on the second lane marking information after fading out the lane marking based on the first lane marking information, fade in the lane marking based on the second lane marking information after erasing the lane marking based on the first lane marking information, or fade in the lane marking based on the second lane marking information after fading out the lane marking based on the first lane marking information.

Here, for example, a deviation (slight deviation) may occur between the position of the lane marking based on the first lane marking information and the position of the lane marking based on the second lane marking information. In this case, when the display of the lane marking based on the first lane marking information is switched to the display of the lane marking based on the second lane marking information, the position of the lane marking displayed on the display may be different before and after the switching. Therefore, when the display is switched between the display of the lane marking based on the first lane marking information and the display of the lane marking based on the second lane marking information, the in-vehicle display device performs at least one of fading in the lane marking when displaying the lane marking or fading out the lane marking when erasing the lane marking. That is, when the information source of the lane marking is switched, the in-vehicle display device does not perform the immediate switching of the display of the lane marking. When the display of the lane marking is immediately switched without using fade-in and fade-out, the lane marking may suddenly disappear, and the lane marking may be suddenly displayed at a position different from a position where the lane marking has disappeared, which may cause the occupant to feel incompatibility. As described above, the in-vehicle display device can switch the information source for displaying the lane marking while reducing a feeling of incompatibility of the occupant by using at least one of the fade-in or the fade-out.

Another aspect of the present disclosure is an in-vehicle display device that displays a lane marking of a road on a display of a vehicle, the in-vehicle display device including: an acquisition unit configured to acquire first lane marking information including information on a position of the lane marking and second lane marking information including information on a position of the lane marking and different from the first lane marking information; and a display controller configured to perform display of the lane marking based on the first lane marking information and display of the lane marking based on the second lane marking information, as display of the lane marking on the display, in which the display controller is configured to, when the display of the lane marking based on the first lane marking information is switched to the display of the lane marking based on the second lane marking information, gradually transition the lane marking from the position of the lane marking being displayed based on the first lane marking information to the position of the lane marking to be displayed based on the second lane marking information.

When the display of the lane marking based on the first lane marking information is switched to the display of the lane marking based on the second lane marking information, the in-vehicle display device gradually transitions the lane marking to the position of the lane marking to be displayed based on the second lane marking information. That is, when the information source of the lane marking is switched, the in-vehicle display device does not perform the immediate switching of position of the lane marking displayed on the display. When the display position of the lane marking is immediately switched, the lane marking may suddenly disappear, and the lane marking may be suddenly displayed at a position different from a position where the lane marking has disappeared, which may cause the occupant to feel incompatibility. As described above, the in-vehicle display device can switch the information source for displaying the lane marking while reducing a feeling of incompatibility of the occupant by gradually transitioning the lane marking to the position of the lane marking to be displayed based on the second lane marking information after the display is switched.

In the in-vehicle display device, the first lane marking information may include information on a position of the lane marking of an own lane on which the vehicle travels, the second lane marking information may include information on a position of the lane marking of the own lane and information on a position of the lane marking of an adjacent lane adjacent to the own lane, and the display controller may be configured to, when the display of the lane marking based on the first lane marking information is switched to the display of the lane marking based on the second lane marking information, gradually transition the lane marking of the own lane from the position of the lane marking of the own lane being displayed based on the first lane marking information to the position of the lane marking of the own lane to be displayed based on the second lane marking information, and further display the lane marking of the adjacent lane at the position of the lane marking of the adjacent lane based on the second lane marking information, after the transition is completed.

For example, when the information sources of the lane markings are different, the positions of the lane markings displayed based on these information sources may be deviated from each other. Therefore, when the lane marking of the own lane and the lane marking of the adjacent lane having different information sources are displayed in combination, the lane markings may intersect each other, or the display may be such that a lane width is wide or narrow. Therefore, the in-vehicle display device displays the lane marking of the adjacent lane based on the second lane marking information after the display of the lane marking of the own lane is switched to the display of the lane marking of the own lane based on the second lane marking information. That is, the in-vehicle display device can display the lane marking of the adjacent lane in a state in which the information source of the lane marking of the own lane and the information source of the lane marking of the adjacent lane are the same (both are the second lane marking information). Accordingly, even when the in-vehicle display device newly displays the lane marking of the adjacent lane in addition to the lane marking of the own lane, it is possible to reduce a feeling of incompatibility of the occupant.

In the in-vehicle display device, the display controller may be configured to, when the display of the lane marking is switched from the display based on the first lane marking information to the display based on the second lane marking information again within a predetermined determination time after switching the display of the lane marking from the display based on the second lane marking information to the display based on the first lane marking information, not display the lane marking of the adjacent lane at the position of the lane marking of the adjacent lane based on the second lane marking information until a predetermined display standby time elapses after gradually transitioning the lane marking of the own lane from the position of the lane marking of the own lane being displayed based on the first lane marking information to the position of the lane marking of the own lane to be displayed based on the second lane marking information.

For example, the display of the lane marking may be switched in an order of the display based on the second lane marking information, the display based on the first lane marking information, and the display based on the second lane marking information. The lane marking of the own lane is displayed in a case of the display based on the first lane marking information, and the lane marking of the adjacent lane is displayed in addition to the own lane in a case of the display based on the second lane marking information. In this case, the lane marking of the adjacent lane disappears when the display based on the first lane marking information is performed, and the lane marking of the adjacent lane is displayed again when the display based on the second lane marking information is performed. Therefore, when the display based on the second lane marking information is performed again, the in-vehicle display device does not display the lane marking of the adjacent lane until the predetermined display standby time elapses. Accordingly, the in-vehicle display device can prevent the lane marking of the adjacent lane from disappearing for a short period of time and then being displayed again, and reduce a feeling of incompatibility of the occupant.

In the in-vehicle display device, the display controller may be configured to not perform switching between the display of the lane marking based on the first lane marking information and the display of the lane marking based on the second lane marking information until a predetermined switching standby time elapses after performing the switching between the display of the lane marking based on the first lane marking information and the display of the lane marking based on the second lane marking information. In this case, the in-vehicle display device can suppress the switching of the information source of the lane marking and can reduce the feeling of inconvenience of the switching of the display by the occupant.

According to an aspect of the present disclosure, it is possible to switch an information source for displaying a lane marking while reducing a feeling of incompatibility of an occupant.

DETAILED DESCRIPTION

Figure 1:
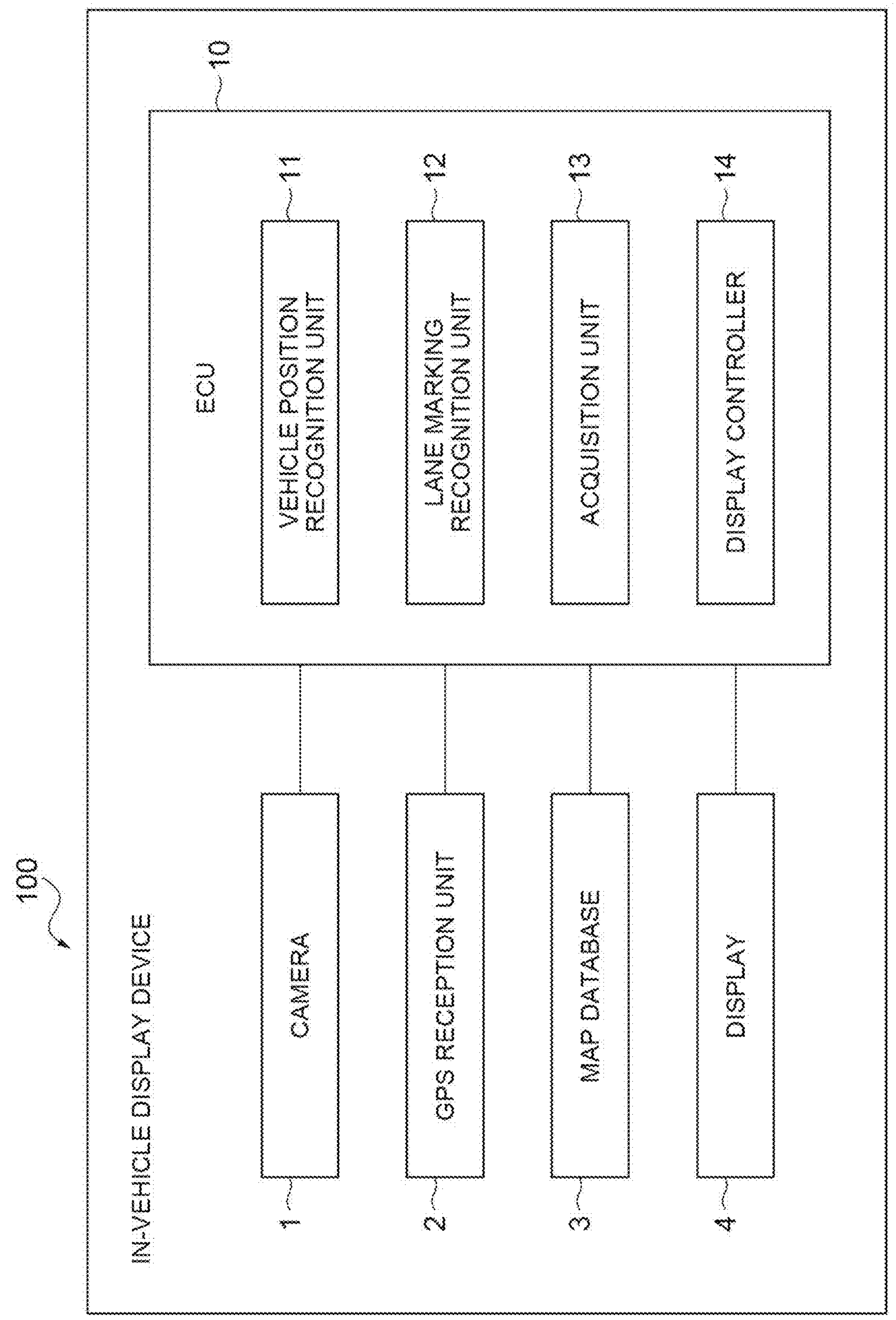
FIG. 1 is a block diagram showing an example of an in-vehicle display device according to a first embodiment.

Hereinafter, exemplary embodiments will be described with reference to the drawings. In each figure, the same or corresponding elements are designated by the same reference numerals, and duplicate descriptions will be omitted.

First Embodiment

A first embodiment of an in-vehicle display device will be described. An in-vehicle display device 100 shown in FIG. 1 is mounted on a vehicle (hereinafter, referred to as a host vehicle) such as a passenger vehicle or a freight vehicle, and performs image display according to a peripheral situation of the host vehicle. The in-vehicle display device 100 displays a lane marking of a road (a lane marking for dividing a lane provided on the road) on a display 4 as the image display according to a peripheral situation of the host vehicle. The in-vehicle display device 100 includes an electronic control unit (ECU) 10 that comprehensively manages the device. The ECU 10 is an electronic control unit having a central processing unit (CPU) and a storage unit. The storage unit includes, for example, a read-only memory (ROM), a random-access memory (RAM), an electrically erasable programmable read-only memory (EEPROM), or the like. In the ECU 10, for example, various functions are implemented by the CPU executing a program stored in the storage unit. The ECU 10 may include a plurality of electronic units.

A camera 1, a GPS reception unit 2, a map database 3, and the display 4 are connected to the ECU 10. The camera 1 is imaging equipment that captures an image of an external situation of the host vehicle. The camera 1 is provided on a rear side of a windshield of the host vehicle, for example, and captures an image of a situation in front of the host vehicle. The camera 1 transmits a captured image related to the external situation of the host vehicle to the ECU 10. In the present embodiment, the camera 1 can image a road ahead of the host vehicle. The GPS reception unit 2 measures a position of the host vehicle (for example, the latitude and longitude of the host vehicle) by receiving signals from three or more GPS satellites. The GPS reception unit 2 transmits measured position information on the host vehicle to the ECU 10.

The map database 3 is a database that stores map information. The map database 3 is provided in, for example, a storage unit mounted on the host vehicle. The map information includes position information (a position on a map) on a road (lane), information on a road shape (lane shape) (for example, types of curve and straight portions, curvature of curve, and the like), position information on a road structure, and the like. The map database 3 may be stored in a server that can communicate with the host vehicle. In the present embodiment, the map information stored in the map database 3 includes "map lane marking information (second lane marking information)" which is information related to the lane marking. The map lane marking information includes information on a position of the lane marking. In addition, when a plurality of lanes are present on the road, the map lane marking information includes information on positions of a plurality of lane markings for dividing each lane. The map lane marking information is not limited to being defined for all areas. The map lane marking information may be defined only for a part of the area.

The display 4 is a display device provided inside a vehicle cabin of the host vehicle. The display 4 may be a center display, a multi-information display (MID), or a head-up display (HUD). The display 4 displays various types of information in response to a control signal from the ECU 10.

The ECU 10 functionally includes a vehicle position recognition unit 11, a lane marking recognition unit 12, an acquisition unit 13, and a display controller 14. The vehicle position recognition unit 11 recognizes the position of the host vehicle. The vehicle position recognition unit 11 can recognize the position of the host vehicle based on the position information measured by the GPS reception unit 2. In addition, the vehicle position recognition unit 11 may recognize the position of the host vehicle with a known simultaneous localization and mapping (SLAM) technique using position information of a fixed obstacle such as a utility pole included in the map information of the map database 3 and a detection result of radar or the like mounted on the host vehicle.

The lane marking recognition unit 12 recognizes a position of a lane marking in front of the host vehicle based on the captured image of the camera 1. For example, the lane marking recognition unit 12 extracts the lane marking using a known image processing technique based on the captured image, and recognizes the position of the lane marking with respect to the host vehicle. The lane marking recognition unit 12 may recognize each position of the lane marking on a line. The lane marking recognition unit 12 may recognize an absolute position of the lane marking represented by the latitude, the longitude, and the like as the position of the lane marking. Hereinafter, the information on the position of the lane marking recognized by the lane marking recognition unit 12 based on the captured image of the camera 1 is referred to as "camera lane marking information (first lane marking information)".

Figure 2:
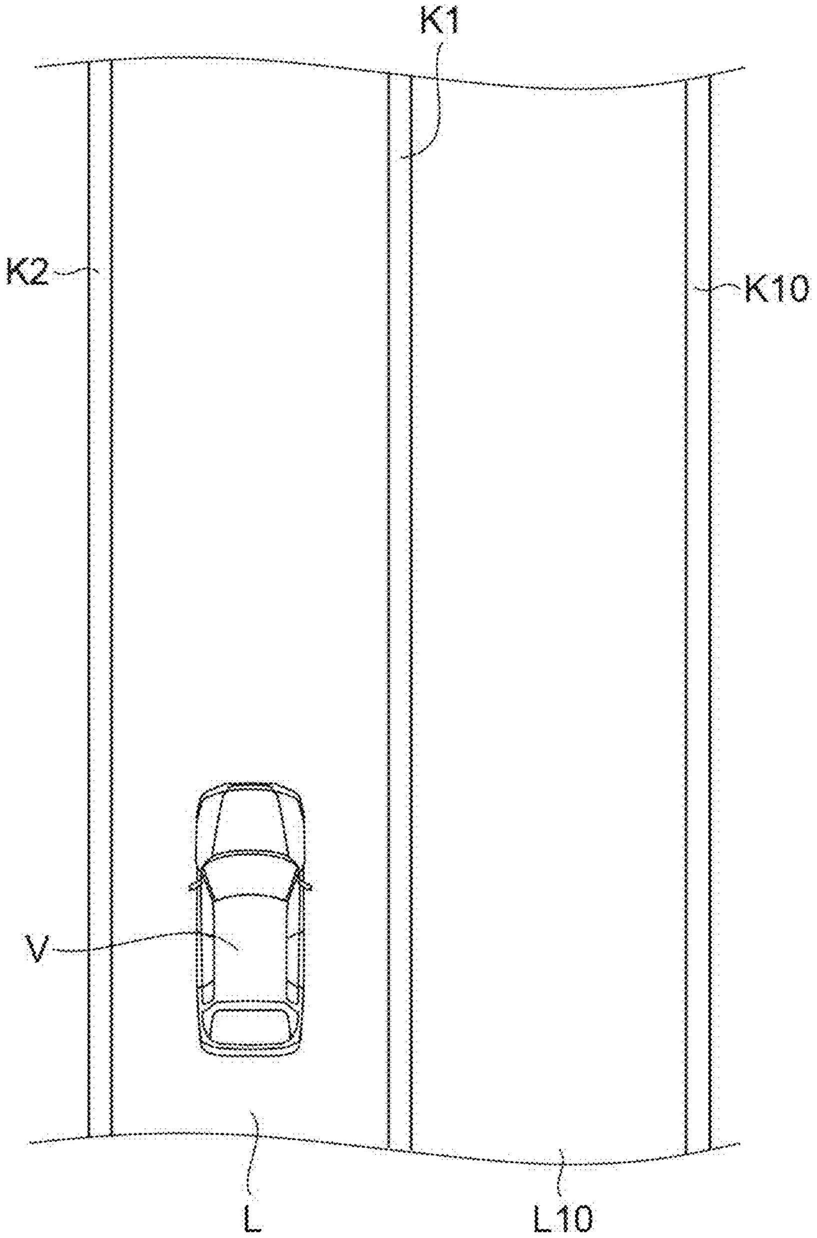
FIG. 2 is a top view showing a road on which a host vehicle travels.

As shown in FIG. 2, for example, it is assumed that a host vehicle V travels on an own lane L and an adjacent lane L10 is present on the right side of the own lane L. The own lane L is formed by a pair of lane markings which are a lane marking K1 and a lane marking K2, and the adjacent lane L10 is formed by a pair of lane markings which are the lane marking K1 and a lane marking K10. That is, the lane marking K1 is a lane marking on the right side of the own lane L and is also a lane marking on the left side of the adjacent lane L10.

In the present embodiment, lane markings of an own lane mean a pair of lane markings (a lane marking on the left side and a lane marking on the right side) forming the own lane. A lane marking of an adjacent lane adjacent to the own lane means a lane marking that does not double as the lane marking of the own lane among a pair of lane markings forming the adjacent lane. That is, in the example shown in FIG. 2, the lane markings of the own lane refer to the lane markings K1 and K2. The lane marking of the adjacent lane L10 refers to the lane marking K10.

The lane marking recognition unit 12 recognizes the lane marking of the own lane based on the captured image of the camera 1. In addition, when the road on which the host vehicle travels includes a plurality of lanes, the lane marking recognition unit 12 recognizes the lane marking of the adjacent lane in addition to the lane marking of the own lane based on the captured image of the camera 1. However, depending on a traveling position of an additional vehicle around the host vehicle, a road shape, and the like, the lane marking of the adjacent lane cannot be imaged by the camera 1 (imaging may be difficult) in some cases. Therefore, the lane marking recognition unit 12 may be able to recognize only the lane marking of the own lane even when a plurality of lanes are present.

The acquisition unit 13 acquires the camera lane marking information recognized by the lane marking recognition unit 12 and the map lane marking information stored in the map database 3. The map lane marking information is different from the camera lane marking information. Here, the map lane marking information being different from the camera lane marking information may be information sources being different when recognizing (setting) the position of the lane marking, may be methods being different when recognizing (setting) the position of the lane marking, or may be accuracy being different for the position of the lane marking. As described above, the camera lane marking information is recognized based on the captured image of the camera 1 mounted on the host vehicle. The map lane marking information stored in the map database 3 is information set in advance. Therefore, the map lane marking information and the camera lane marking information are different from each other.

The display controller 14 controls the display of the lane marking on the display 4. The display controller 14 performs, as the display of the lane marking on the display 4, the display of the lane marking based on the camera lane marking information acquired by the acquisition unit 13 and the display of the lane marking based on the map lane marking information acquired by the acquisition unit 13. Here, the display controller 14 performs any one of the display of the lane marking based on the camera lane marking information or the display of the lane marking based on the map lane marking information. When performing the display of the lane marking based on the map lane marking information, the display controller 14 can determine the lane marking of an area to be displayed based on the position information of the host vehicle recognized by the vehicle position recognition unit 11 and the position information of the lane marking included in the map lane marking information.

Figure 3:
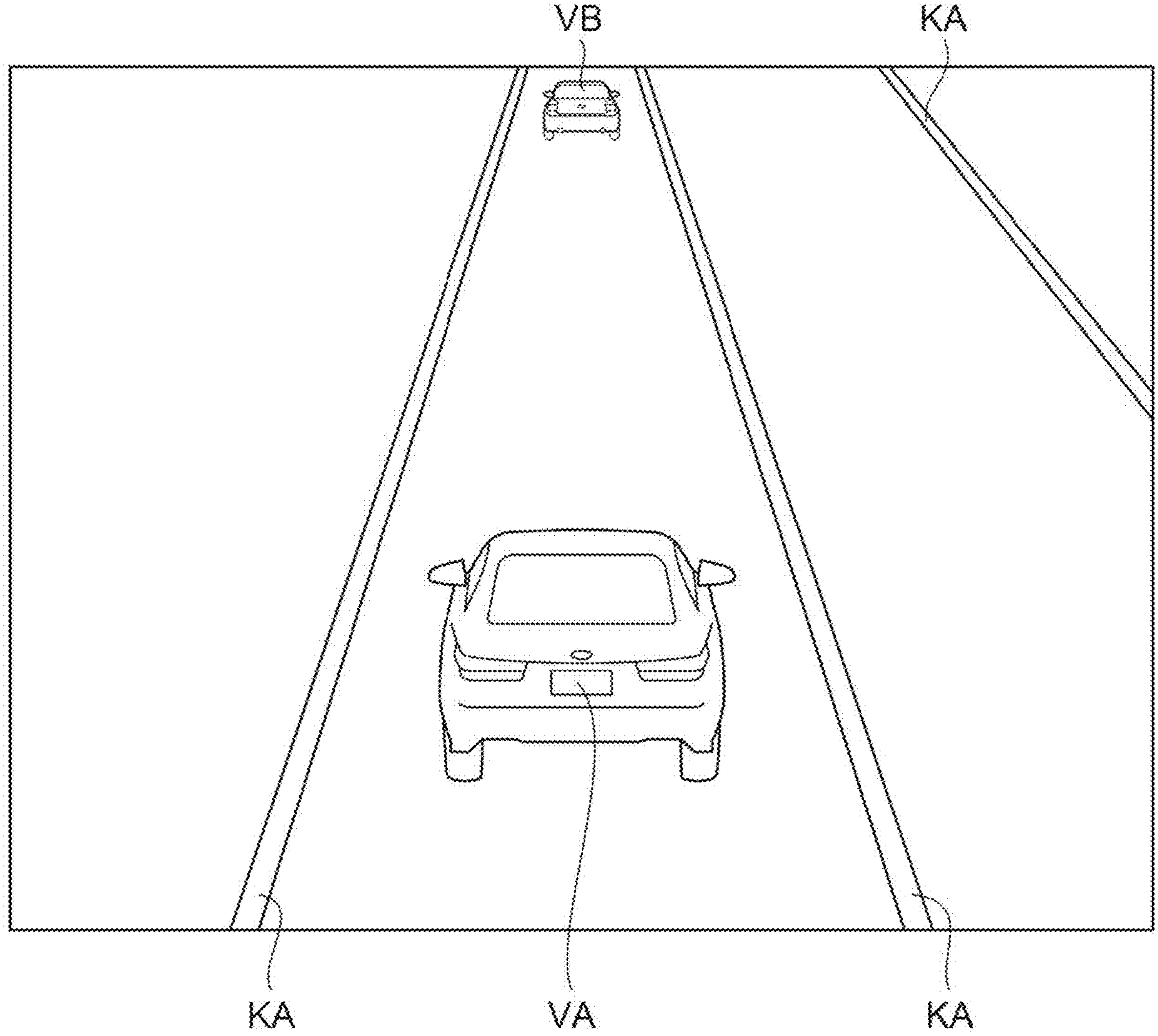
FIG. 3 is a diagram showing an example of a display image of a lane marking on a display.

In the present embodiment, as shown in FIG. 3, the display controller 14 displays a lane marking KA on the display 4 and displays a host vehicle icon VA indicating the host vehicle. The display controller 14 displays the host vehicle icon VA and the lane marking KA such that the host vehicle icon VA and the lane marking KA are shown in a diagram in which the host vehicle and the lane marking are viewed from the rear and diagonally upward of the host vehicle. Displaying the lane marking KA on the display 4 is displaying an image (for example, a line) corresponding to the lane marking on the display 4.

The display controller 14 displays the lane marking at a position of the display 4 corresponding to the position of the lane marking of the camera lane marking information as the display of the lane marking based on the camera lane marking information. Specifically, when the display controller 14 displays the lane marking based on the camera lane marking information on the display 4, the display controller 14 displays the host vehicle icon VA and the lane marking KA such that a positional relationship between the position of the actual host vehicle and the position of the lane marking based on the camera lane marking information and a positional relationship between the host vehicle icon VA displayed on the display 4 and the lane marking KA based on the camera lane marking information correspond to each other.

In addition, the display controller 14 displays the lane marking at the position of the display 4 corresponding to the position of the lane marking of the map lane marking information, as the display of the lane marking based on the map lane marking information. Specifically, when the display controller 14 displays the lane marking based on the map lane marking information on the display 4, the display controller 14 displays the host vehicle icon VA and the lane marking KA such that a positional relationship between the position of the actual host vehicle and the position of the lane marking based on the map lane marking information and a positional relationship between the host vehicle icon VA displayed on the display 4 and the lane marking KA based on the map lane marking information correspond to each other.

The additional vehicle may be detected around the host vehicle by radar or the like mounted on the host vehicle. In this case, the display controller 14 may display an additional vehicle icon VB indicating the detected additional vehicle on the display 4. In this case, the display controller 14 displays the additional vehicle icon VB such that a positional relationship between the position of the actual host vehicle and a position of the detected additional vehicle and a positional relationship between the position of the host vehicle icon VA displayed on the display 4 and a position of the additional vehicle icon VB correspond to each other.

The display controller 14 switches between the display of the lane marking based on the camera lane marking information and the display of the lane marking based on the map lane marking information based on various conditions such as a recognition situation of the lane marking based on the traveling position of the host vehicle and the captured image of the camera 1. For example, when the display of the lane marking based on the map lane marking information is being performed, the host vehicle may enter an area in which the map lane marking information is not included in the map information. In this case, the display controller 14 cannot perform the display of the lane marking based on the map lane marking information. In such a case, the display controller 14 switches the display of the lane marking based on the map lane marking information to the display of the lane marking based on the camera lane marking information. In addition, for example, because of a situation of the additional vehicle around the host vehicle, or influence of fog, backlight, or the like, the lane marking recognition unit 12 may not be able to appropriately recognize the lane marking based on the captured image of the camera 1. In such a case, the display controller 14 switches the display of the lane marking based on the camera lane marking information to the display of the lane marking based on the map lane marking information.

As described above, the display controller 14 determines whether or not switching the display of the lane marking is necessary based on various conditions such as the recognition situation of the lane markings based on the traveling position of the host vehicle and the captured image of the camera 1 as described above. In addition, priority used for the display of the lane marking may be defined for the camera lane marking information and the map lane marking information. In this case, the display controller 14 may determine whether or not the switching of the display is necessary based on the defined priority when both the camera lane marking information and the map lane marking information are available. For example, it is assumed that the display of the lane marking is performed based on the information having the lower priority among the camera lane marking information and the map lane marking information. In this state, it is assumed that the information having the higher priority can also be used. In this case, the display controller 14 determines that it is necessary to switch the display of the lane marking based on the information having the lower priority to the display of the lane marking based on the information having the higher priority among the camera lane marking information and the map lane marking information. When it is determined that the switching of the display of the lane marking is necessary, the display controller 14 performs the switching between the display of the lane marking based on the camera lane marking information and the display of the lane marking based on the map lane marking information.

Figure 4:
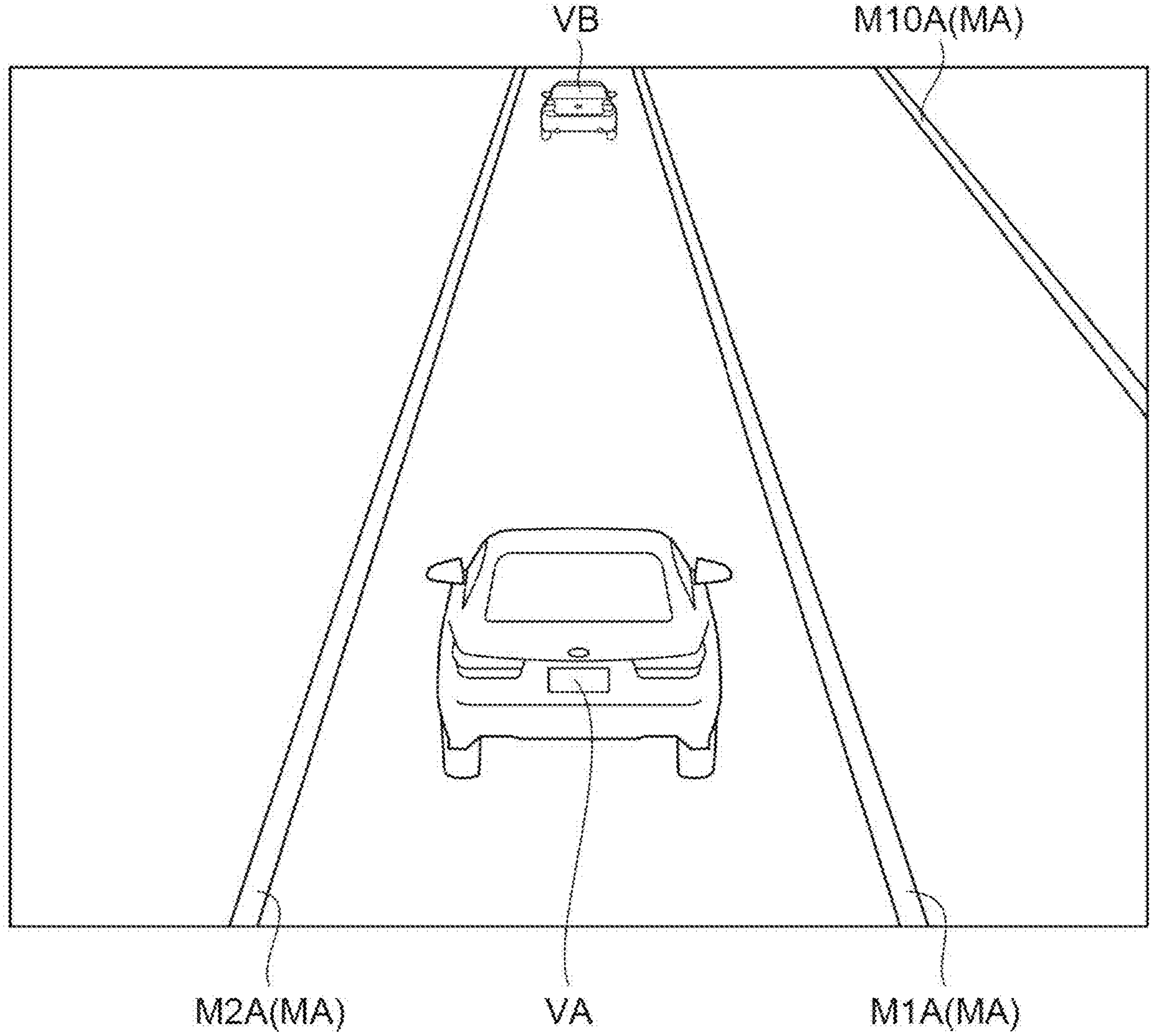
FIG. 4 is a diagram showing an example of a display image of a lane marking based on camera lane marking information on the display.

Hereinafter, a case where it is determined that the switching of the display of the lane marking is necessary and the display controller 14 switches between the display of the lane marking based on the camera lane marking information and the display of the lane marking based on the map lane marking information will be described. Here, for example, as shown in FIG. 4, a state is assumed in which a lane marking MA based on the camera lane marking information is displayed on the display 4. A case where it is determined that the switching of the display of the lane marking is necessary in this state and the display is switched to the display of the lane marking based on the map lane marking information will be described. It is assumed that the lane marking recognition unit 12 is in a state in which the lane markings K1 and K2 of the own lane L of the host vehicle V and the lane marking K10 of the adjacent lane L10 is recognized as shown in FIG. 2 based on the captured image of the camera 1. In addition, as shown in FIG. 2, a state is assumed in which the map lane marking information stored in the map database 3 includes information on positions of the lane markings K1 and K2 of the own lane L of the host vehicle V and information on a position of the lane marking K10 of the adjacent lane L10 around the traveling position of the host vehicle V.

The lane marking MA based on the camera lane marking information shown in FIG. 4 includes a lane marking MIA corresponding to the lane marking K1 (refer to FIG. 2) of the own lane L, A lane marking M2A corresponding to the lane marking K2 (refer to FIG. 2) of the own lane L, and a lane marking M10A corresponding to the lane marking K10 (refer to FIG. 2) of the adjacent lane L10.

Figure 5:
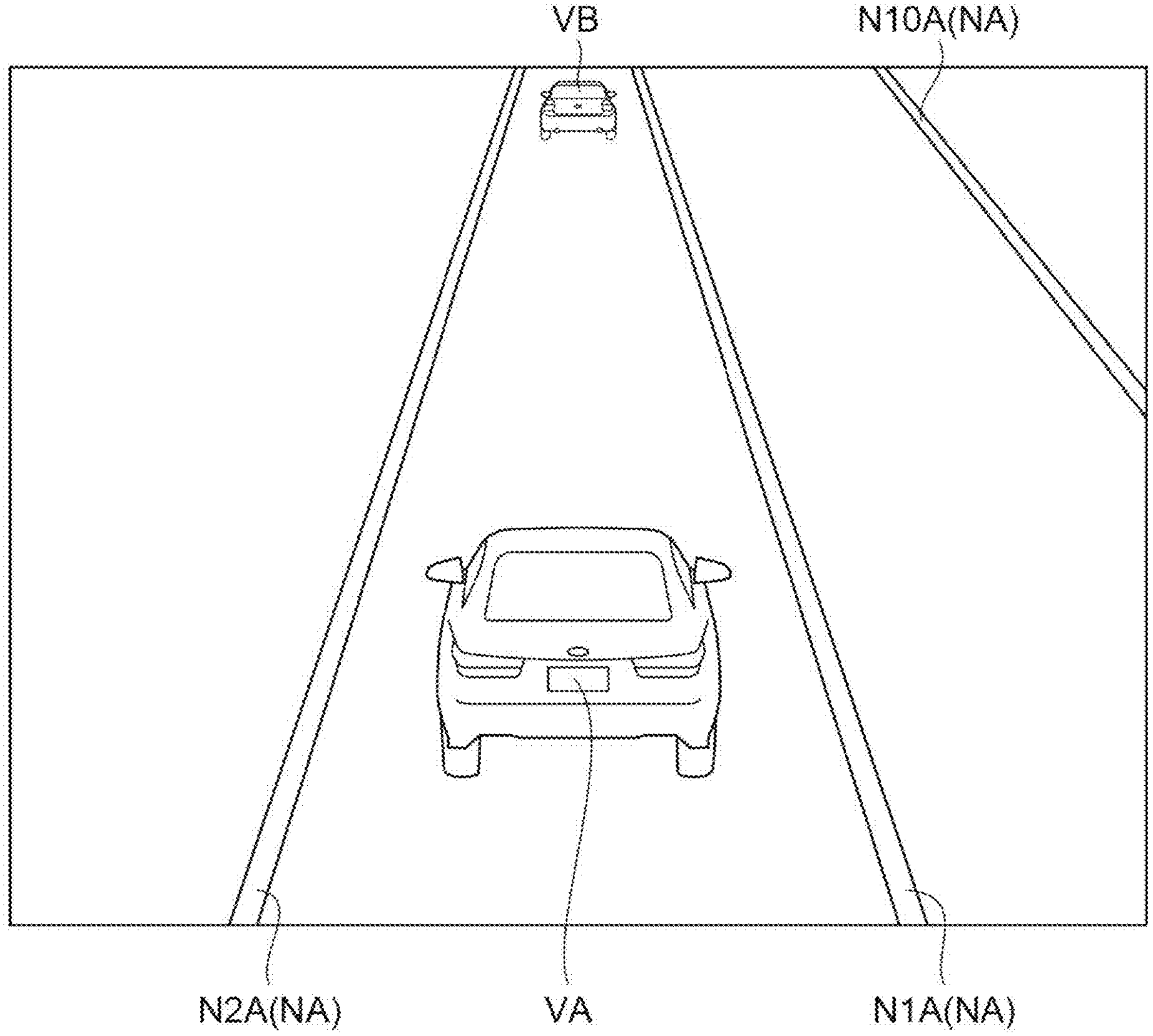
FIG. 5 is a diagram showing an example of a display image of a lane marking based on map lane marking information on the display.

When display of the lane marking MA based on the camera lane marking information shown in FIG. 4 is switched to display of a lane marking NA based on the map lane marking information shown in FIG. 5, the display controller 14 fades in the lane marking NA based on the map lane marking information after fading out the lane marking MA based on the camera lane marking information. The lane marking NA based on the map lane marking information shown in FIG. 5 includes a lane marking N1A corresponding to the lane marking K1 (refer to FIG. 2) of the own lane L, A lane marking N2A corresponding to the lane marking K2 (refer to FIG. 2) of the own lane L, and a lane marking N10A corresponding to the lane marking K10 (refer to FIG. 2) of the adjacent lane L10, similarly to the lane marking MA based on the camera lane marking information.

It should be noted that fading out the lane marking may be gradually softening color of the lane marking, may be gradually bringing the color of the lane marking closer to background color, may be gradually decreasing brightness of the lane marking, may be gradually reducing a thickness of the lane marking, or may be a combination of two or more of these. In addition, fading in the lane marking may be gradually deepening the color of the lane marking, may be gradually bringing the color of the lane marking closer to color to be originally displayed from the background color, may be gradually increasing the brightness of the lane marking, may be gradually increasing the thickness of the lane marking, or may be a combination of two or more of these.

In addition, when the display of the lane marking MA based on the camera lane marking information shown in FIG. 4 is switched to the display of the lane marking NA based on the map lane marking information shown in FIG. 5, the display controller 14 may display the lane marking NA based on the map lane marking information after fading out the lane marking MA based on the camera lane marking information. Here, displaying the lane marking NA based on the map lane marking information is not gradually displaying the lane marking NA like fade-in, but is immediately displaying the lane marking NA.

Further, when the display of the lane marking MA based on the camera lane marking information shown in FIG. 4 is switched to the display of the lane marking NA based on the map lane marking information shown in FIG. 5, the display controller 14 may fade in the lane marking NA based on the map lane marking information after erasing the lane marking MA based on the camera lane marking information. Here, erasing the lane marking MA based on the camera lane marking information is not gradually erasing the display like fade-out, but immediately erasing the display of the lane marking MA.

In this way, when it is determined that the switching of the display of the lane marking is necessary, the display controller 14 switches the display of the lane marking MA based on the camera lane marking information shown in FIG. 4 to the display of the lane marking NA based on the map lane marking information shown in FIG. 5 by using at least one of fade-in or fade-out. As shown in FIG. 5, when the lane marking NA based on the map lane marking information is displayed, it may be determined that the switching of the display of the lane marking is necessary. In this case as well, the display controller 14 switches the display of the lane marking NA based on the map lane marking information shown in FIG. 5 to the display of the lane marking MA based on the camera lane marking information shown in FIG. 4 by using at least one of fade-in or fade-out.

Here, for example, a deviation (slight deviation) may occur between the position of the lane marking MA based on the camera lane marking information and the position of the lane marking NA based on the map lane marking information. This may occur, for example, because of an error in the recognition of the lane marking based on the captured image of the camera 1, an error in the recognition of the position of the host vehicle V when the lane marking is displayed based on the map lane marking information, and the like. In this case, for example, when the display of the lane marking MA based on the camera lane marking information is switched to the display of the lane marking NA based on the map lane marking information, the position of the lane marking displayed on the display 4 may be different before and after the switching.

Therefore, when the display is switched between the display of the lane marking based on the camera lane marking information and the display of the lane marking based on the map lane marking information, the display controller 14 of the in-vehicle display device 100 performs at least one of fading in the lane marking when displaying the lane marking or fading out the lane marking when erasing the lane marking. That is, when the information source of the lane marking is switched, the in-vehicle display device 100 does not perform the immediate switching of the display of the lane marking. When the display of the lane marking is immediately switched without using fade-in and fade-out, the lane marking may suddenly disappear, and the lane marking may be suddenly displayed at a position different from a position where the lane marking has disappeared, which may cause the occupant to feel incompatibility. As described above, the in-vehicle display device 100 can switch the information source for displaying the lane marking while reducing a feeling of incompatibility of an occupant by using at least one of the fade-in or the fade-out.

A configuration may be adopted in which the display controller 14 does not switch between the display of the lane marking based on the camera lane marking information and the display of the lane marking based on the map lane marking information after the switching between the display of the lane marking based on the camera lane marking information and the display of the lane marking based on the map lane marking information is performed and until a predetermined switching standby time elapses. The predetermined switching standby time is defined in advance. In this case, the in-vehicle display device 100 can suppress the switching of the information source of the lane marking and can reduce the feeling of inconvenience of the switching of the display by the occupant. The switching of the display of the lane marking is suppressed in a state in which both the camera lane marking information and the map lane marking information are available. After it is determined that the switching is necessary, the display of the lane marking based on the information before the switching is maintained until a predetermined switching standby time elapses. The display controller 14 switches the display of the lane marking after a predetermined switching standby time elapses.

Second Embodiment

Figure 6:
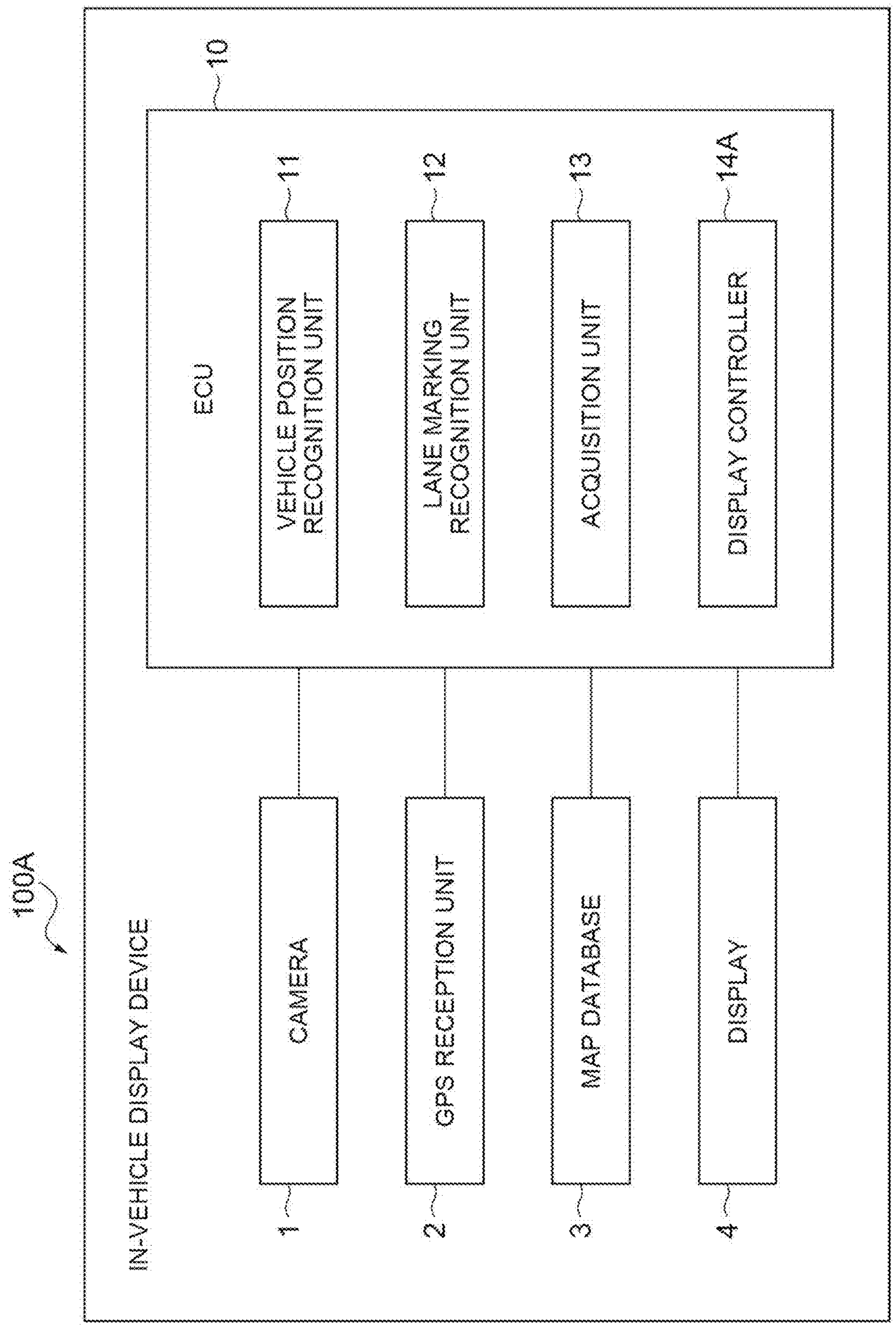
FIG. 6 is a block diagram showing an example of an in-vehicle display device according to a second embodiment.

Next, a second embodiment of the in-vehicle display device will be described. As shown in FIG. 6, an in-vehicle display device 100A according to the present embodiment includes a display controller 14A instead of the display controller 14 of the in-vehicle display device 100 according to the first embodiment. The configurations other than the display controller 14A in the present embodiment are the same as those in the first embodiment, and the detailed description thereof will be omitted.

The display controller 14A displays the lane marking at the position of the lane marking based on the camera lane marking information or displays the lane marking at the position of the lane marking based on the map lane marking information on the display 4. The display controller 14A is different from the display controller 14 according to the first embodiment only in the configuration when switching the display of the lane markings, and the other configurations are the same as the configurations of the display controller 14 according to the first embodiment.

Figure 7:
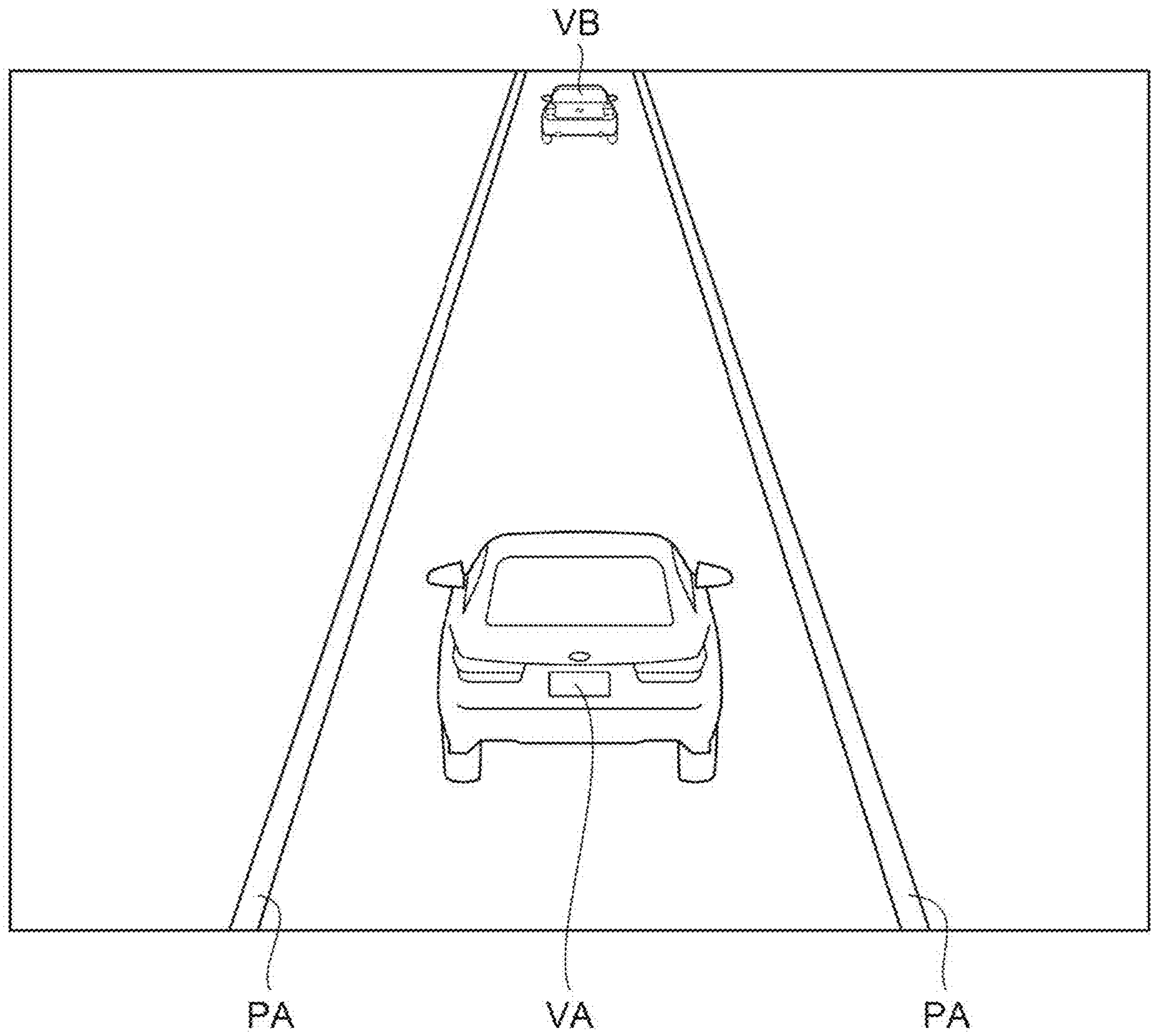
FIG. 7 is a diagram showing an example of a display image of a lane marking based on the camera lane marking information on the display.

Hereinafter, a case where it is determined that the switching of the display of the lane marking is necessary and the display controller 14A switches between the display of the lane marking based on the camera lane marking information and the display of the lane marking based on the map lane marking information will be described. For example, as shown in FIG. 7, a state is assumed in which a lane marking PA is displayed at the position of the lane marking based on the camera lane marking information. When it is determined that the switching of the display of the lane marking is necessary in this state, the display controller 14A displays the lane marking PA at the position of the lane marking based on the map lane marking information as shown in FIG. 8.

For example, it is assumed that a deviation in position occurs even though the position of the lane marking based on the camera lane marking information and the position of the lane marking based on the map lane marking information are on the same division. In this case, when the display controller 14A switches the display of the lane marking PA based on the camera lane marking information shown in FIG. 7 to the display of the lane marking PA based on the map lane marking information shown in FIG. 8, the display controller 14A gradually transitions the lane marking PA from the position of the lane marking being displayed based on the camera lane marking information to the position of the lane marking to be displayed based on the map lane marking information.

Figure 9:
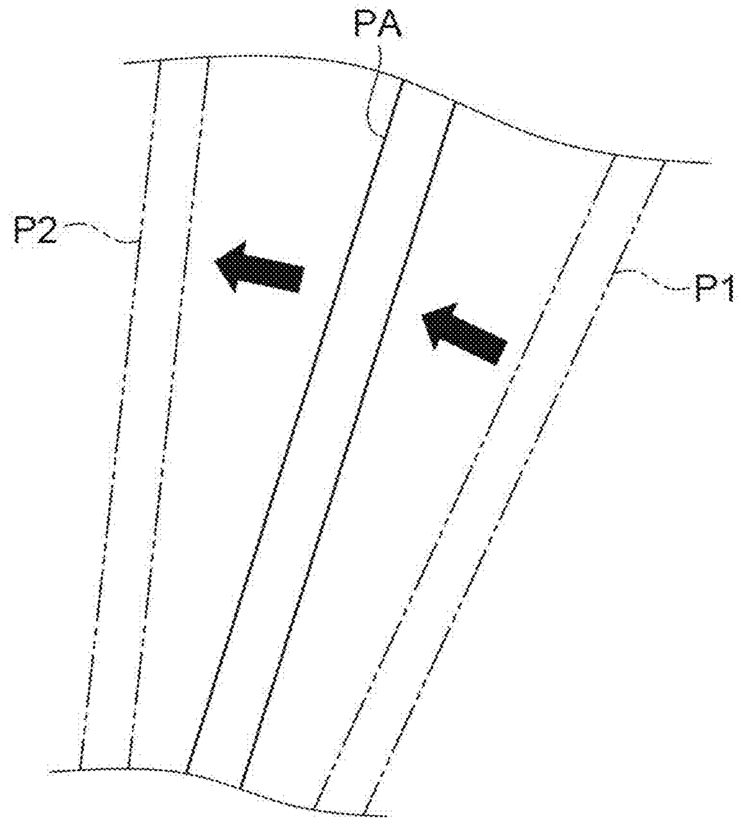
FIG. 9 is a diagram illustrating a state in which the lane marking is gradually transitioned and displayed.

Specifically, for example, as shown in FIG. 9, a deviation occurs between a display position P1 of the lane marking displayed on the display 4 based on the camera lane marking information and a display position P2 of the lane marking displayed on the display 4 based on the map lane marking information. In such a case, the display controller 14A gradually transitions the lane marking PA from the display position P1 of the lane marking displayed based on the camera lane marking information to the display position P2 of the lane marking to be displayed based on the map lane marking information.

Figure 8:
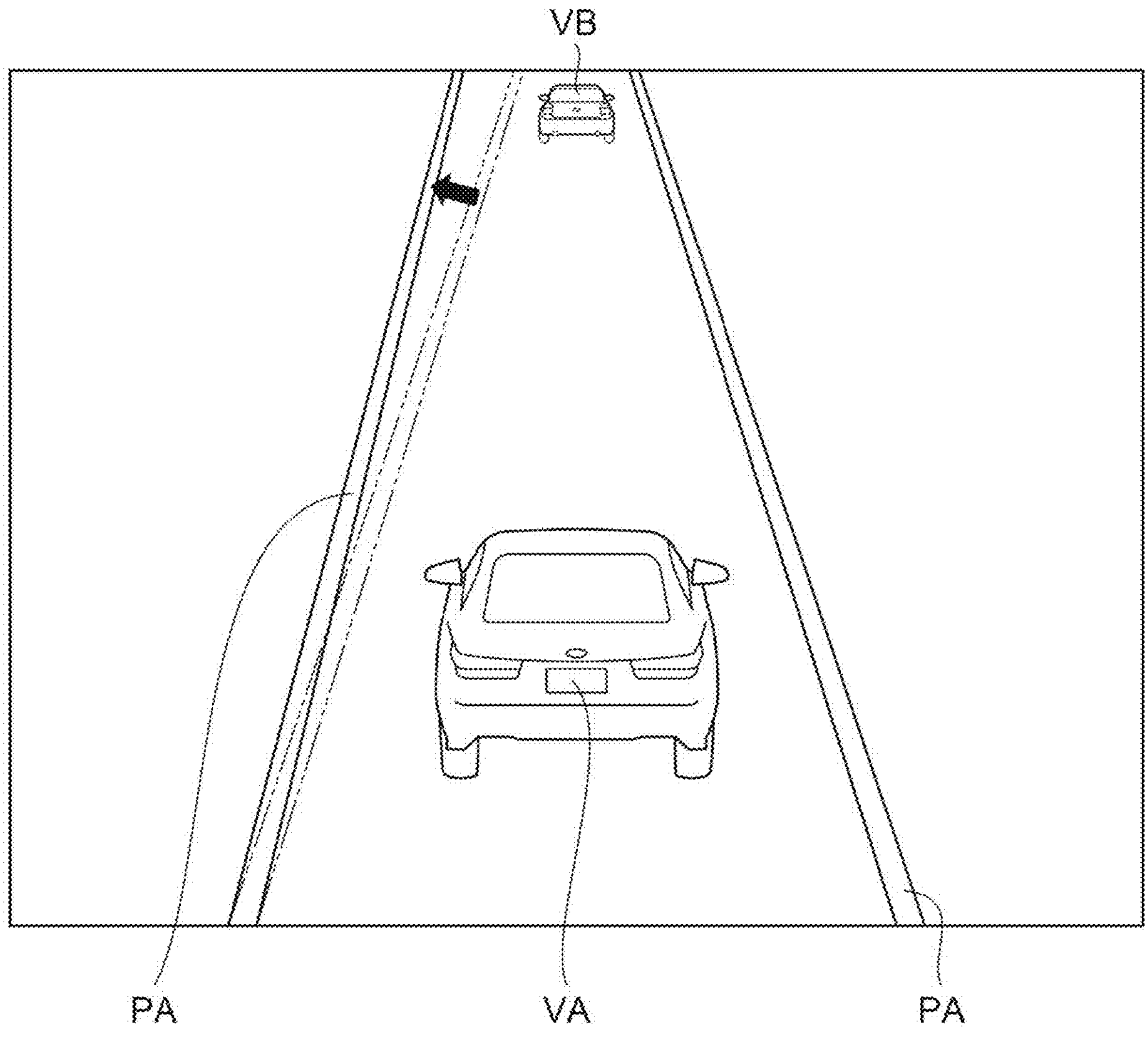
FIG. 8 is a diagram showing an example of a display image of the lane marking based on the map lane marking information on the display.

For example, in the examples shown in FIGS. 7 and 8, the position of the lane marking PA on a left side of the host vehicle icon VA is deviated between the lane marking based on the camera lane marking information and the lane marking based on the map lane marking information. Therefore, as shown in FIG. 8, the lane marking PA on the left side of the host vehicle icon VA is gradually transitioned from the position of the lane marking displayed based on the camera lane marking information to the position of the lane marking to be displayed based on the map lane marking information.

The transition of the lane marking performed when switching the display of the lane marking is not performed when there is no deviation in the position of the lane marking before and after the switching. For example, a configuration may be adopted in which the transition of the lane marking is performed when the deviation in the position of the lane marking before and after the switching has a deviation amount equal to or greater than a predetermined deviation amount. For example, when the display of the lane marking is switched, the display controller 14A determines whether or not there is a deviation in the position of the lane marking before and after the switching. A configuration may be adopted in which the display controller 14A gradually transitions the lane marking when there is a deviation.

As described above, when it is determined that the switching of the display of the lane markings is necessary, the display controller 14A switches the display of the lane marking PA based on the camera lane marking information shown in FIG. 7 to the display of the lane marking PA based on the map lane marking information shown in FIG. 8 while gradually transitioning the lane marking based on the deviation of the lane marking. When the lane marking PA based on the map lane marking information is displayed as shown in FIG. 8, it may be determined that the switching of the display of the lane marking is necessary. In this case as well, the display controller 14A switches the display of the lane marking PA based on the map lane marking information shown in FIG. 8 to the display of the lane marking PA based on the camera lane marking information shown in FIG. 7 while gradually transitioning the lane marking based on the deviation of the lane marking.

Here, the number of the lane markings included in the camera lane marking information and the number of the lane markings included in the map lane marking information may be different from each other. For example, as shown in FIG. 2, the camera lane marking information may include information on the positions of the lane markings K1 and K2 of the own lane L on which the host vehicle V travels, and may not include information on the position of the lane marking K10 of the adjacent lane L10. As this case, for example, a case where the lane marking K10 cannot be detected by the camera 1 as the lane marking K10 is hidden by an additional vehicle around the host vehicle V can be mentioned. Meanwhile, the map lane marking information may include information on the positions of the lane markings K1 and K2 of the own lane L and information on the position of the lane marking K10 of the adjacent lane L10 adjacent to the own lane L.

Figure 10:
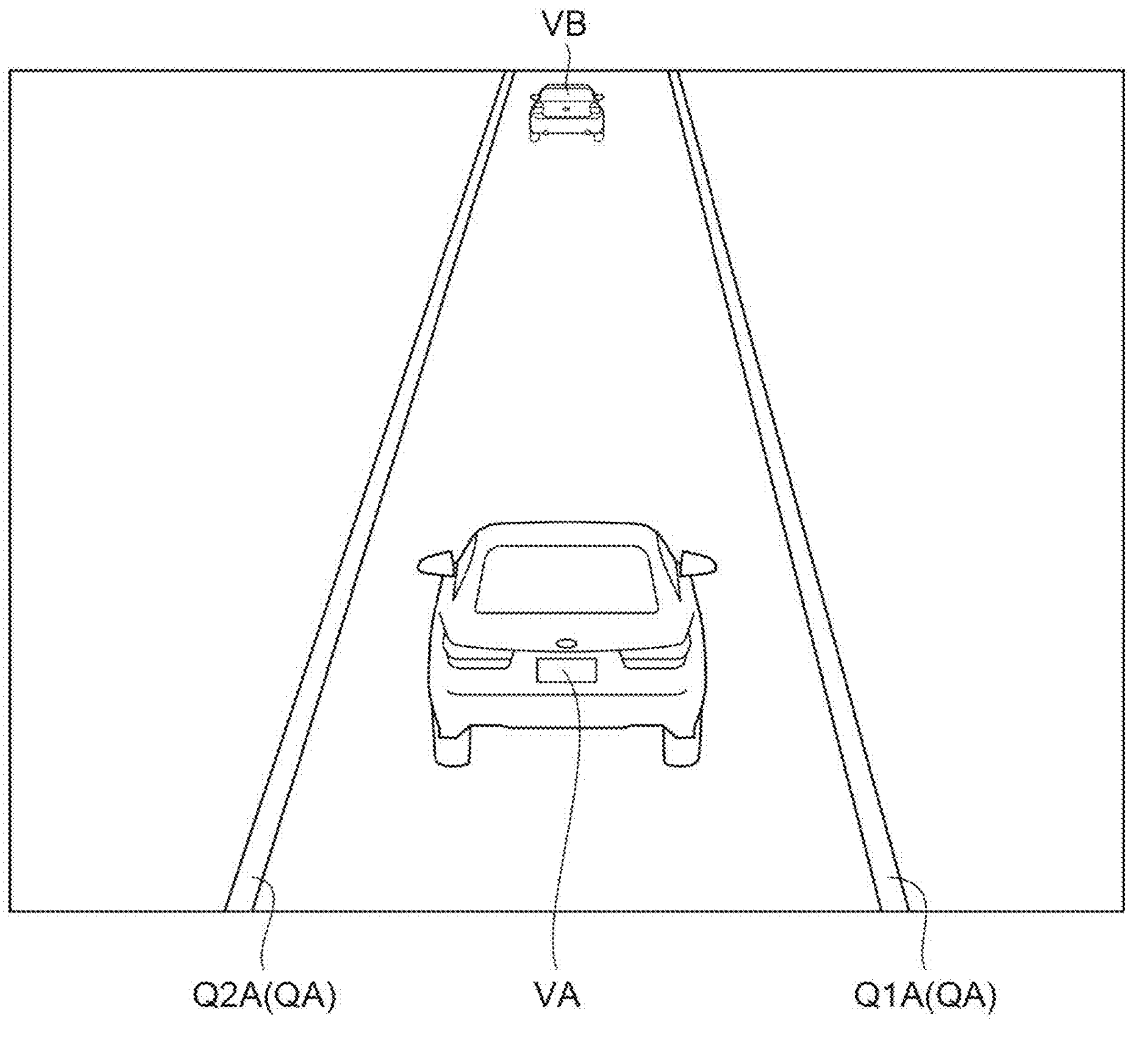
FIG. 10 is a diagram showing an example of a display image of a lane marking based on the camera lane marking information on the display.

As described above, when the number of the lane markings included in the map lane marking information is greater than the number of the lane markings included in the camera lane marking information, the number of the lane markings displayed on the display 4 increases when the display of the lane markings based on the camera lane marking information is switched to the display of the lane markings based on the map lane marking information. Here, as shown in FIG. 10, a state is assumed in which a lane marking QA based on the camera lane marking information is displayed on the display 4. The lane marking QA based on the camera lane marking information shown in FIG. 10 includes a lane marking Q1A corresponding to the lane marking K1 (refer to FIG. 2) of the own lane L and a lane marking Q2A corresponding to the lane marking K2 (refer to FIG. 2) of the own lane L. A case where it is determined that the switching of the display of the lane marking is necessary in this state and the display is switched to the display of the lane marking based on the map lane marking information will be described. Here, it is assumed that the display is switched so that the lane marking of the adjacent lane is newly displayed in addition to the lane marking of the own lane.

Figure 11:
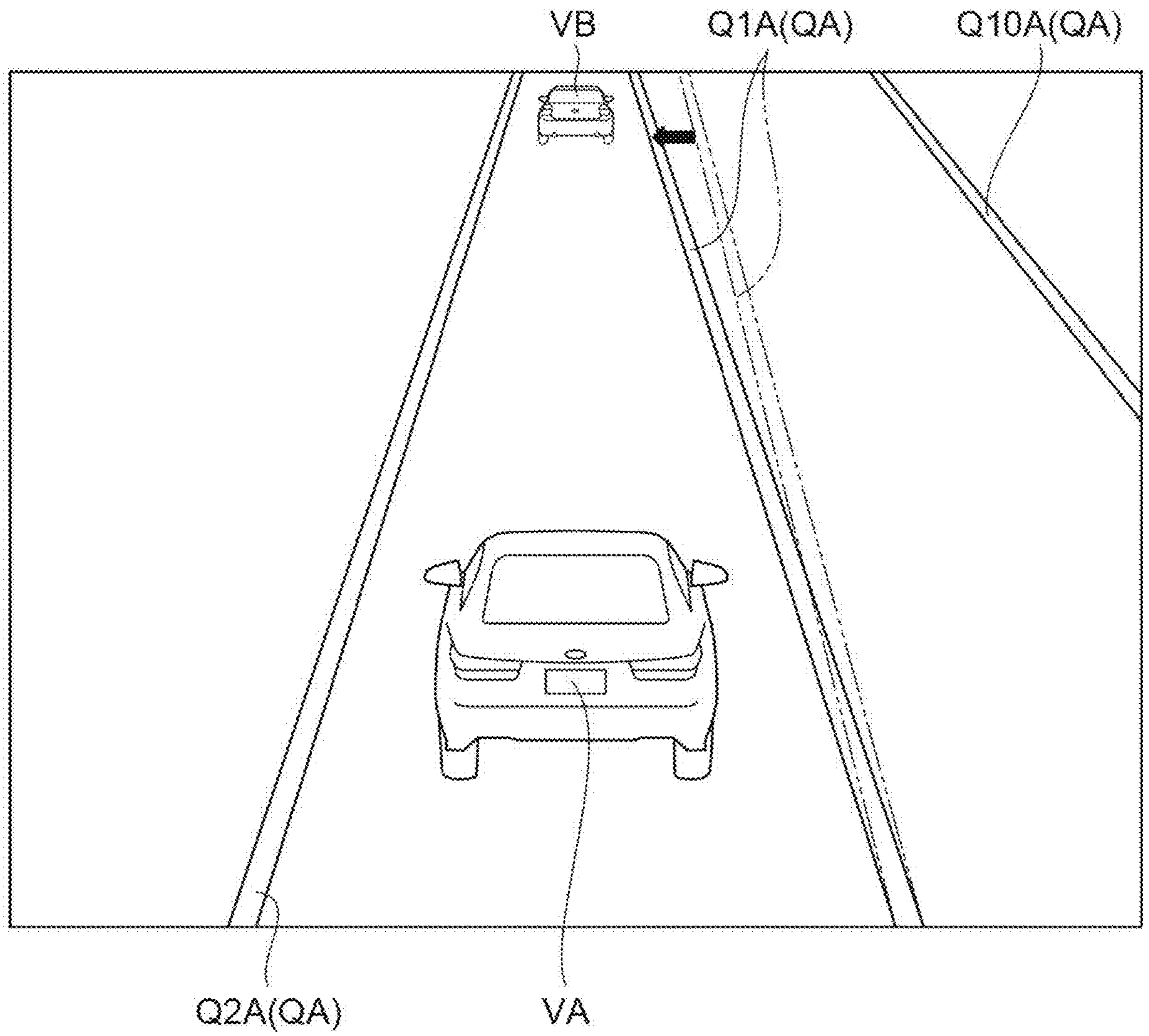
FIG. 11 is a diagram showing an example of a display image of the lane marking based on the map lane marking information on the display.

When the display of the lane marking is switched, the display controller 14A first switches the display of the lane marking of the own lane and then displays the lane marking of the adjacent lane. Specifically, when the display of the lane marking is switched, the display controller 14A displays the lane markings Q1A and Q2A as the lane marking QA at the position of the lane marking of the own lane based on the map lane marking information as shown in FIG. 11. In this case, a deviation may occur between the position of the lane marking of the own lane based on the camera lane marking information and the position of the lane marking of the own lane based on the map lane marking information. In this case, the display controller 14A gradually transitions the lane marking of the own lane from the position of the lane marking of the own lane being displayed based on the camera lane marking information as described above to the position of the lane marking of the own lane to be displayed based on the map lane marking information.

For example, in the examples shown in FIGS. 10 and 11, the position of the lane marking Q1A on a right side of the host vehicle icon VA is deviated between the lane marking based on the camera lane marking information and the lane marking based on the map lane marking information. Therefore, as shown in FIG. 11, the lane marking Q1A on the right side of the host vehicle icon VA is gradually transitioned from the position of the lane marking displayed based on the camera lane marking information to the position of the lane marking to be displayed based on the map lane marking information.

After the transition (display) of the lane marking QA of the own lane is completed, the display controller 14A further displays the lane marking Q10A of the adjacent lane at the position of the lane marking of the adjacent lane based on the map lane marking information. That is, after the lane markings Q1A and Q2A of the own lane are displayed at the position of the lane marking based on the map lane marking information, the lane marking Q10A of the adjacent lane based on the map lane marking information is displayed.

As described above, when the display of the lane marking based on the camera lane marking information is switched to the display of the lane marking based on the map lane marking information, the display controller 14A of the in-vehicle display device 100A gradually transitions the lane marking to the position of the lane marking to be displayed based on the map lane marking information. That is, when the information source of the lane marking is switched, the in-vehicle display device 100A does not perform the immediate switching of position of the lane marking displayed on the display 4. When the display position of the lane marking is immediately switched, the lane marking may suddenly disappear, and the lane marking may be suddenly displayed at a position different from a position where the lane marking has disappeared, which may cause the occupant to feel incompatibility. As described above, the in-vehicle display device 100A can switch the information source for displaying the lane marking while reducing a feeling of incompatibility of the occupant by gradually transitioning the lane marking to the position of the lane marking to be displayed based on the map lane marking information after the display is switched.

For example, when the information sources of the lane markings are different, the positions of the lane markings displayed based on these information sources may be deviated from each other. Therefore, when the lane marking of the own lane and the lane marking of the adjacent lane having different information sources are displayed in combination, the lane markings may intersect each other, or the display may be such that a lane width is wide or narrow. For example, in the example shown in FIG. 11, when the lane marking Q1A of the own lane based on the camera lane marking information indicated by two-dot chain lines and the lane marking Q10A of the adjacent lane based on the map lane marking information are displayed at the same time, a width of the adjacent lane represented by the lane marking Q1A and the lane marking Q10A is narrowed. As a result, the occupant may feel incompatibility.

Therefore, the display controller 14A of the in-vehicle display device 100A displays the lane marking of the adjacent lane based on the map lane marking information after the display of the lane marking of the own lane is switched to the display of the lane marking of the own lane based on the map lane marking information. That is, the in-vehicle display device can display the lane marking of the adjacent lane in a state in which the information source of the lane marking of the own lane and the information source of the lane marking of the adjacent lane are the same (here, a state in which both are the map lane marking information). Accordingly, even when the in-vehicle display device 100A newly displays the lane marking of the adjacent lane in addition to the lane marking of the own lane, it is possible to reduce a feeling of incompatibility of the occupant.

First Modification Example of Second Embodiment

A first modification example of the second embodiment will be described. In this modification example, processing of preventing the switching of the display of the lane marking in the display controller 14A from being performed within a short period of time is added. Here, as in the second embodiment, a state is assumed in which the camera lane marking information includes the information on the positions of the lane markings K1 and K2 of the own lane L on which the host vehicle V travels, and does not include the information on the position of the lane marking K10 of the adjacent lane L10. Meanwhile, a state is assumed in which the map lane marking information includes the information on the positions of the lane markings K1 and K2 of the own lane L and the information on the position of the lane marking K10 of the adjacent lane L10 adjacent to the own lane L.

In this state, the display controller 14A may switch the display based on the camera lane marking information to the display based on the map lane marking information again within a predetermined determination time after switching the display of the lane marking from the display based on the map lane marking information to the display based on the camera lane marking. The predetermined determination time is defined in advance. When the switching is performed, the lane marking of the adjacent lane disappears in a state in which the lane marking of the own lane and the lane marking of the adjacent lane are displayed on the display 4, and then the lane marking of the adjacent lane is displayed again in addition to the lane marking of the own lane. When the time during which the lane marking of the adjacent lane disappears is short, the occupant who sees the display of the lane marking of the adjacent lane that disappears only for a moment may feel incompatibility.

Therefore, when the display of the lane marking based on the camera lane marking information is switched to the display of the lane marking based on the map lane marking information, the display controller 14A can delay a display timing of the lane marking of the adjacent lane based on the map lane marking information. Here, as described above, the display controller 14A gradually transitions the lane marking of the own lane from the position of the lane marking of the own lane being displayed based on the camera lane marking information to the position of the lane marking of the own lane to be displayed based on the map lane marking information. The display controller 14A does not display the lane marking of the adjacent lane at the position of the lane marking of the adjacent lane based on the map lane marking information until a predetermined display standby time elapses after the transition of the lane marking of the own lane is completed. The predetermined display standby time is defined in advance. After the predetermined display standby time elapses, the display controller 14A displays the lane marking of the adjacent lane at the position of the lane marking of the adjacent lane based on the map lane marking information.

As described above, for example, the display of the lane marking may be switched in an order of the display based on the map lane marking information, the display based on the camera lane marking information, and the display based on the map lane marking information. The lane marking of the own lane is displayed in a case of the display based on the camera lane marking information, and the lane marking of the adjacent lane is displayed in addition to the own lane in a case of the display based on the map lane marking information. In this case, the lane marking of the adjacent lane disappears when the display based on the camera lane marking information is performed, and the lane marking of the adjacent lane is displayed again when the display based on the map lane marking information is performed. Therefore, when the display based on the map lane marking information is performed again, the display controller 14A of the in-vehicle display device 100A does not display the lane marking of the adjacent lane until the predetermined display standby time elapses. Accordingly, the in-vehicle display device 100A can prevent the lane marking of the adjacent lane from disappearing for a short period of time and then being displayed again, and reduce a feeling of incompatibility of the occupant.

Second Modification Example of Second Embodiment

A second modification example of the second embodiment will be described. In this modification example, processing of preventing the switching of the display of the lane marking in the display controller 14A from being performed within a short period of time is added. Here, the display controller 14A does not perform the switching between the display of the lane marking based on the camera lane marking information and the display of the lane marking based on the map lane marking information until the predetermined switching standby time elapses after performing the switching between the display of the lane marking based on the camera lane marking information and the display of the lane marking based on the map lane marking information. After a predetermined switching standby time elapses, the display controller 14A switches the display of the lane marking. In this case, the in-vehicle display device 100A can suppress the switching of the information source of the lane marking and can reduce the feeling of inconvenience of the switching of the display by the occupant. The switching of the display of the lane marking is suppressed in a state in which both the camera lane marking information and the map lane marking information are available. After it is determined that the switching is necessary, the display of the lane marking based on the information before the switching is maintained until the predetermined switching standby time elapses. The display controller 14A switches the display of the lane marking after the predetermined switching standby time elapses.

Although various embodiments and various modification examples of the present disclosure have been described above, the present disclosure is not limited to each of the above-described embodiments and modification examples. For example, the cases where the display controllers 14 and 14A switch between the display of the lane marking based on the camera lane marking information and the display of the lane marking based on the map lane marking information have been described. The information source when the display controller 14 or the like switches the display of the lane marking is not limited to the camera lane marking information and the map lane marking information. For example, the display controller 14 or the like may switch between display of the lane marking based on first map lane marking information and display of the lane marking based on second map lane marking information. The second map lane marking information may be information created based on a accuracy or an information source different from that of the first map lane marking information. A configuration need only be adopted in which the display controller 14 or the like switches the display of the lane marking based on lane marking information different from each other. In addition, in the second embodiment and the like, a case where the number of the lane markings included in the map lane marking information is greater than the number of the lane markings included in the camera lane marking information has been described as an example. However, the present disclosure is not limited thereto, and the number of the lane markings included in the camera lane marking information may be greater than the number of the lane markings included in the map lane marking information.

The display of the lane marking on the display 4 shown in FIG. 4 and the like is an example, and is not limited to, for example, a diagram in which the host vehicle and the lane marking are viewed from the rear and diagonally upward of the host vehicle. A diagram (plan view) in which the host vehicle and the lane marking are viewed from above may be displayed on the display 4.

What is claimed is:

1. An in-vehicle display device that displays a lane marking of a road on a display of a vehicle, the in-vehicle display device comprising:
- an acquisition unit configured to acquire first lane marking information including information on a position of the lane marking and second lane marking information including information on a position of the lane marking and different from the first lane marking information; and
- a display controller configured to perform display of the lane marking based on the first lane marking information and display of the lane marking based on the second lane marking information, as display of the lane marking on the display,
- wherein the display controller is configured to
  - when the display of the lane marking based on the first lane marking information is switched to the display of the lane marking based on the second lane marking information,
  - display the lane marking based on the second lane marking information after fading out the lane marking based on the first lane marking information,
  - fade in the lane marking based on the second lane marking information after erasing the lane marking based on the first lane marking information, or
  - fade in the lane marking based on the second lane marking information after fading out the lane marking based on the first lane marking information.

2. An in-vehicle display device that displays a lane marking of a road on a display of a vehicle, the in-vehicle display device comprising:
- an acquisition unit configured to acquire first lane marking information including information on a position of the lane marking and second lane marking information including information on a position of the lane marking and different from the first lane marking information; and
- a display controller configured to perform display of the lane marking based on the first lane marking information and display of the lane marking based on the second lane marking information, as display of the lane marking on the display,
- wherein the display controller is configured to
  - when the display of the lane marking based on the first lane marking information is switched to the display of the lane marking based on the second lane marking information,
  - gradually transition the lane marking from the position of the lane marking being displayed based on the first lane marking information to the position of the lane marking to be displayed based on the second lane marking information.

3. The in-vehicle display device according to claim 2,
- wherein the first lane marking information includes information on a position of the lane marking of an own lane on which the vehicle travels,
- the second lane marking information includes information on a position of the lane marking of the own lane and information on a position of the lane marking of an adjacent lane adjacent to the own lane, and
- the display controller is configured to
  - when the display of the lane marking based on the first lane marking information is switched to the display of the lane marking based on the second lane marking information,
  - gradually transition the lane marking of the own lane from the position of the lane marking of the own lane being displayed based on the first lane marking information to the position of the lane marking of the own lane to be displayed based on the second lane marking information, and
  - further display the lane marking of the adjacent lane at the position of the lane marking of the adjacent lane based on the second lane marking information, after the transition is completed.

4. The in-vehicle display device according to claim 3,
- wherein the display controller is configured to
  - when the display of the lane marking is switched from the display based on the first lane marking information to the display based on the second lane marking information again within a predetermined determination time after switching the display of the lane marking from the display based on the second lane marking information to the display based on the first lane marking information,
  - not display the lane marking of the adjacent lane at the position of the lane marking of the adjacent lane based on the second lane marking information until a predetermined display standby time elapses after gradually transitioning the lane marking of the own lane from the position of the lane marking of the own lane being displayed based on the first lane marking information to the position of the lane marking of the own lane to be displayed based on the second lane marking information.

5. The in-vehicle display device according to claim 1,
- wherein the display controller is configured to not perform switching between the display of the lane marking based on the first lane marking information and the display of the lane marking based on the second lane marking information until a predetermined switching standby time elapses after performing the switching between the display of the lane marking based on the first lane marking information and the display of the lane marking based on the second lane marking information.

* * * * *